(12) United States Patent
Dejean et al.

(10) Patent No.: US 8,706,475 B2
(45) Date of Patent: Apr. 22, 2014

(54) METHOD AND APPARATUS FOR DETECTING A TABLE OF CONTENTS AND REFERENCE DETERMINATION

(75) Inventors: Herve Dejean, Grenoble (FR); Jean-Luc Meunier, St Nazaire les Eymes (FR); Olivier Fambon, Grenoble (FR)

(73) Assignee: Xerox Corporation, Norwalk, CT (US)

(*) Notice: Subject to any disclaimer, the term of this patent is extended or adjusted under 35 U.S.C. 154(b) by 2913 days.

(21) Appl. No.: 11/032,814

(22) Filed: Jan. 10, 2005

(65) Prior Publication Data

US 2006/0155703 A1 Jul. 13, 2006

(51) Int. Cl.
*G06F 17/20* (2006.01)
*G06F 17/27* (2006.01)
*G06F 3/00* (2006.01)
*G06F 7/00* (2006.01)

(52) U.S. Cl.
USPC ............ 704/9; 704/1; 715/700; 715/731; 715/256; 715/712; 715/713; 707/736; 707/752

(58) Field of Classification Search
CPC . G06F 17/20; G06F 17/2235; G06F 17/2241; G06F 17/27; G06F 17/2705; G06F 17/2715; G06F 17/2745; G06F 17/2765; G06F 17/211
USPC .......... 704/1, 9; 715/500, 531, 256; 707/5, 7, 707/102
See application file for complete search history.

(56) References Cited

U.S. PATENT DOCUMENTS

| | | | |
|---|---|---|---|
| 5,434,962 A | 7/1995 | Kyojima et al. | |
| 5,491,628 A | 2/1996 | Wakayama et al. | |
| 6,167,368 A * | 12/2000 | Wacholder | 704/9 |
| 6,199,061 B1 * | 3/2001 | Blewett et al. | 707/3 |
| 6,298,357 B1 | 10/2001 | Wexler et al. | |
| 6,487,566 B1 | 11/2002 | Sundaresan | |
| 6,490,603 B1 | 12/2002 | Keenan et al. | |
| 6,578,056 B1 * | 6/2003 | Lamburt | 715/500.1 |
| 6,687,404 B1 | 2/2004 | Hull et al. | |
| 6,772,120 B1 * | 8/2004 | Moreno et al. | 704/256 |
| 6,772,156 B1 * | 8/2004 | Rogers et al. | 707/9 |
| 6,907,431 B2 * | 6/2005 | Lin | 707/102 |
| 2002/0022956 A1 * | 2/2002 | Ukrainczyk et al. | 704/9 |
| 2002/0143818 A1 | 10/2002 | Roberts et al. | |

(Continued)

OTHER PUBLICATIONS

S. Mandel, S. P. Chowdhury, A. K. Das, Bhabatosh Chanda, "Automated Detection and Segmentation of Table of Contents Pages and Index Pages from Document Images," iciap, p. 213-218, 12th International Conference on Image Analysis and Processing (ICIAP'03), 2003.*

(Continued)

*Primary Examiner* — Paras D Shah
(74) *Attorney, Agent, or Firm* — Fay Sharpe LLP

(57) ABSTRACT

In a method for identifying a table of contents in a document, an ordered sequence of text fragments is derived from the document. A table of contents is selected as a contiguous sub-sequence of the ordered sequence of text fragments satisfying the criteria: (i) entries defined by text fragments of the table of contents each have a link to a target text fragment having textual similarity with the entry; (ii) no target text fragment lies within the table of contents; and (iii) the target text fragments have an ascending ordering corresponding to an ascending ordering of the entries defining the target text fragments.

19 Claims, 10 Drawing Sheets

(56) References Cited

U.S. PATENT DOCUMENTS

| | | | |
|---|---|---|---|
| 2003/0093760 A1 | 5/2003 | Suzuki et al. | |
| 2003/0208502 A1 | 11/2003 | Lin | |
| 2004/0003028 A1 | 1/2004 | Emmett et al. | |
| 2004/0024780 A1* | 2/2004 | Agnihotri et al. | 707/104.1 |
| 2004/0205461 A1 | 10/2004 | Kaufman et al. | |
| 2004/0237037 A1* | 11/2004 | Sweet et al. | 715/513 |
| 2004/0260694 A1* | 12/2004 | Chaudhuri et al. | 707/5 |
| 2005/0010865 A1* | 1/2005 | Kuppusamy et al. | 715/512 |
| 2005/0076000 A1* | 4/2005 | Sweet et al. | 707/1 |

OTHER PUBLICATIONS

Faure, C. Extracting the tables of contents from the images of documents. in Proc. RIAO (Paris, France) 2000, 121-135.*

Belaid, A. "Recognition of table of contents for electronic library consulting." International Journal on Document Analysis and Recogniton, vol. 4. No. 1, Aug. 2001, pp. 39-45.*

Xiaofan Lin, "Text-mining based journal splitting," Document Analysis and Recognition, 2003. Proceedings. Seventh International Conference on, vol., No., pp. 1075-1079, Aug. 3-6, 2003.*

Adler, S., et al., "Extensible stylesheet language (XSL), Version 1.0," W3C 2001, http://www.w3.org/TR/2001/REC-xsl-20011015/.

Aiello, M., Monz, C., Todoran, L., Worring, M., "Document understanding for a broad class of documents", International Journal on Document Analysis and Recognition (IJDAR), vol. 5, 2002, Springer-Verlag, pp. 1-16.

Anjewierden, A., "AIDAS: Incremental logical structure discovery in PDF documents", Proceedings of the International Conference on Document Analysis and Recognition (ICDAR), Seattle, 2001.

Belaïd, A., Pierron, L., Valverde, N., "Part-of-speech tagging for table of contents recognition", International Conference on Pattern Recognition (ICPR 2000), vol. 4, Sep. 3-8, 2000 Barcelona, Spain.

Dori, D., Doermann, D., Shin, C., Haralick, R., Phillips, I., Buchman, M., Ross, D., "The representation of document structure: A generic object-process analysis", Chapter XX, *Handbook on Optical Character Recognition and Document Image Analysis*, World Scientific Publishing Company, 1995/1996, pp. 000-000.

Dori, D., Doermann, D., Shin, C., Haralick, R., Phillips, I., Buchman, M., Ross, D., "The representation of document structure: A generic object-process analysis", Chapter 16, *Handbook of Character Recognition and Document Image Analysis*, World Scientific Publishing Company, 1997, pp. 421-456.

Klink, S., Dengel, A., Kieninger, T., "Document structure analysis based on layout and textual features", Pcroceedings of Fourth IAPR International Workshop on Document Analysis Systems, DAS 2000, Rio de Janeiro, Brazil, 2000, pp. 99-111.

Lin, C.C., Niwa, Y., Narita, S., "Logical structure analysis of book document images using contents of information", 4$^{th}$ International Conference on Document Analysis and Recognition (ICDAR'97), Ulm, Germany, Aug. 1997, pp. 1048, 1054.

Lin, X., "Header and footer extraction by page-association", Hewlett-Packard Company Technical Report, 2002, www.hpl.hp.com/techreports/2002/hpl-2002-129.pdf.

Lin, X., "Text-mining based journal splitting", Proceedings of the Seventh International Conference on Document Analysis and Recognition (ICDAR 2003), vol. II, Aug. 3-6, 2003, Edinburgh, Scotland.

Lin, X., Simske, S., "Automatic document navigation for digital content re-mastering", SPIE COnference on Document Recognition and Retrieval XI, Jan. 18-22, 2004, San Jose, CA.

Power, R., Scott, D., Bouayad-Agha, N., "Document Structure", Computational Linguistics, vol. 29, No. 2, 2003, pp. 211-260.

Satoh, S., Takasu, A., Katsura, E., "An automated generation of electronic library based on document image understanding", Proceedings of the Third International Conference on Document Analysis and Recognition (ICDAR'95), vol. 1, Aug. 14-15, 1995, Tokyo, Japan, pp. 163-166.

Summers, K.M., "Automatic discovery of logical document structure", PhD thesis, Cornell University, Computer Science Department, Aug. 1998, pp. 1-181.

Virk, R., "Converting PDF files into XML", *CambridgeDocs*, 2004, www.cambridgedocs.com.

U.S. Appl. No. 11/032,817, filed Jan. 10, 2005, Herve Dejean et al.

U.S. Appl. No. 11/033,016, filed Jan. 10, 2005, Herve Dejean et al.

Story et al., "The RightPages Image-Based Electronic Library for Alerting and Browsing," Computer, IEEE Service Center, Los Alamitos, CA, US, vol. 25, No. 9, pp. 17-25, 1992.

* cited by examiner

SOURCE FRAGMENT (#i)

| #1 | #2 | #3 | #4 |
|---|---|---|---|
| #5 .3 | #7 .2 | #8 .2 | #14 .6 |
| #7 .4 | #13 .3 | #11 .4 | |

FIG. 5A

METHOD AND APPARATUS FOR DETECTING A TABLE OF CONTENTS AND REFERENCE DETERMINATION

BACKGROUND

The following relates to the information storage and processing arts. It finds particular application in conjunction with cataloging of legacy documents in a marked-up format such as extensible markup language (XML), standard generalized markup language (SGML), hypertext markup language (HTML), or the like, and will be described with particular reference thereto. However, it is to be appreciated that the following is amenable to other like applications.

Legacy document conversion relates to converting unstructured documents existing in formats such as Adobe portable document format (PDF), various text formats, various word processing formats, and so forth into structured documents employing a markup language such as XML, SGML, HTML, or so forth. In structured documents, content is organized into delineated sections with suitable headers and so forth. Such organization typically is implemented using markup tags. In some structured document formats such as XML, a document type definition (DTD) or similar document portion provides overall information about the document, such as an identification of the sections, and facilitates complex document structures such as nested sections.

Unstructured documents, on the other hand, provide limited or no structural information. Many documents in corporate databases, government databases, and other document repositories are in unstructured formats, either because they predate initial use of a structured document format by the owning organization, or because the software, document scanner, or other document source ordinarily outputs in an unstructured format.

There is interest in converting unstructured documents to a structured format. The motivations for converting documents are diverse, typically including intent to reuse or repurpose parts of the documents, desire for document uniformity across a database of information store, facilitating document searches, and so forth. One type of structure which is advantageous to add to an unstructured document is a table of contents. Unstructured documents often contain the text of a table of contents which provides a logical organization or framework for the content of the unstructured document, and it is advantageous to detect and integrate this logical table of contents framework into the structure of the converted structured document.

Existing methods and apparatuses for extracting tables of content from unstructured documents are generally not robust. For example, some existing approaches rely upon font differences between document headings that are indexed in the table of contents and the surrounding text. However, in certain unstructured document formats, such as plain text formats, this font information is unavailable. Some existing approaches rely upon each section indexed in the table of contents starting on a new page. Again, this assumption is not valid for many types of unstructured documents. Some unstructured formats omit pagination altogether. Even if the unstructured format provides pagination, it may be that some sections indexed by the table of contents start in the middle of a page.

The following copending, commonly assigned applications: Method and Apparatus for structuring Documents Based on Their Layout, Content and Collection (Xerox ID 20031509-US-NP, Ser. No. 11/033,016 filed Jan. 10, 2005); Method and Apparatus for Detecting Pagination Constructs Including a Header and a Footer In Legacy Documents (Xerox ID 20040273-US-NP, Ser. No. 11/032,817 filed Jan. 10, 2005); and Systems and Methods for Converting Legacy and Projecting Documents into Extended Markup Language Format (Ser. No. 10/756,313 filed Jan. 14, 2004 and since issued as U.S. Pat. No. 7,165,216) are herein incorporated by reference. Ser. No. 10/756,313 discloses systems and methods for converting legacy and proprietary documents into extended mark-up language format in which the conversion apparatus may be implemented in software on a general purpose computer or may be made of hardware with individual components.

BRIEF DESCRIPTION

In accordance with one aspect, a method is provided for identifying a table of contents in a document. An ordered sequence of text fragments is derived from the document. Links are defined between pairs of text fragments satisfying a textual similarity criterion. Each link includes a source text fragment and a target text fragment. A table of contents is selected from amongst the ordered sequence of text fragments. The table of contents includes a contiguous sub-sequence of the ordered sequence of text fragments. Text fragments of the table of contents define entries each having an optimized target text fragment selected from links that include the entry as the source text fragment. The selected table of contents is optimized with respect to criteria including at least (i) providing an ascending ordering for the optimized target text fragments, and (ii) providing that no entry has an optimized target text fragment that is included in the selected table of contents.

In accordance with another aspect, a method is provided for identifying a table of contents in a document. An ordered sequence of text fragments is derived from the document. A table of contents is selected as a contiguous sub-sequence of the ordered sequence of text fragments satisfying the criteria: (i) entries defined by text fragments of the table of contents each have a link to a target text fragment having textual similarity with the entry; (ii) no target text fragment lies within the table of contents; and (iii) the target text fragments have an ascending ordering corresponding to an ascending ordering of the entries defining the target text fragments.

In accordance with another aspect, an apparatus is disclosed for identifying a table of contents in a document. A text fragmenter derives an ordered sequence of text fragments from the document. A links identifier defines links between pairs of text fragments satisfying a textual similarity criterion. Each link includes a source text fragment and a target text fragment. A candidate table of contents selector selects a plurality of candidate tables of contents. Each candidate includes a contiguous sub-sequence of the ordered sequence of text fragments that potentially can satisfy criteria including at least an ordering criterion and a non-self-referencing criterion. A table of contents selector selects one of the candidate tables of contents. A links optimizer selects optimized links for text fragments defining entries of the selected table of contents. The optimized links satisfy the ordering criterion and the non-self-referencing criterion.

BRIEF DESCRIPTION OF THE DRAWINGS

FIGS. 5A-5D diagrammatically show processing for optimizing links in a selected table of contents.

DETAILED DESCRIPTION

Figure 1:
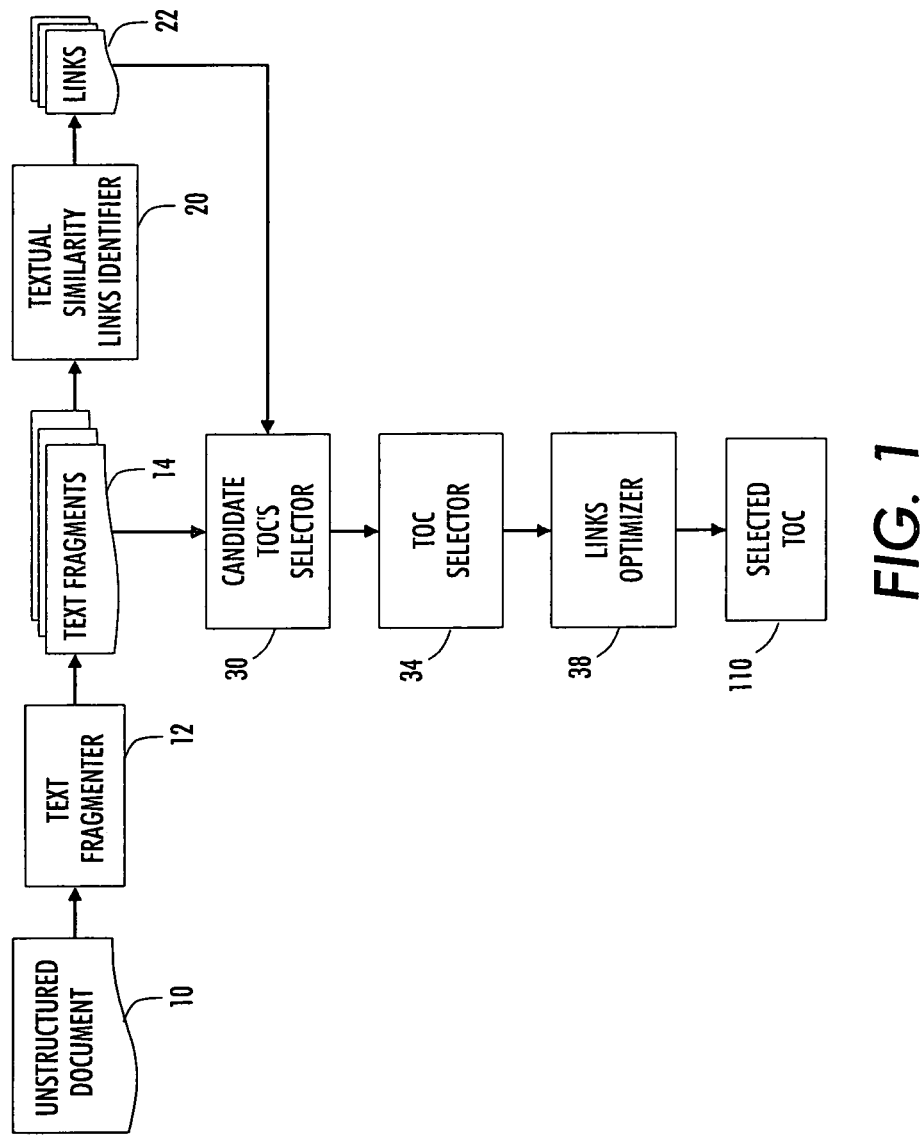
FIG. 1 diagrammatically shows an apparatus for identifying a table of contents.

With reference to FIG. 1, an apparatus is described for identifying a table of contents in an unstructured document 10. A text fragmenter 12 breaks the unstructured document 10 into an ordered sequence of text fragments 14. Typically, the unstructured document 10 is loaded as a list of text strings from a text or XML file produced from a document in an input format (such as Adobe PDF, Word FrameMaker, or so forth), using an off-the-shelf converter. A paper document is suitably scanned using an optical scanner and processed by optical character recognition (OCR). For a text document, each line suitably becomes a fragment ordered line by line. For an XML or HTML document, each PCDATA suitably becomes a text fragment.

Several strategies can be used to order the textual fragments: depth-first left-to-right traversal (document order) or use of the fragment position in the page. Also, the relationship between XML nodes and text fragments can be preserved in order to map the detected table of contents and references back onto XML nodes at the end of the process. It is to be appreciated that the text fragmenter 12 can fragment the textual content in lines, blocks, series of words of a line, or even may split a word across two text fragments (for example, due to a different formatting on the first character of the first word of a title). The table of contents identifying approaches described herein have been found to be robust with respect to these various types of text fragmentations.

The resulting ordered sequence of text fragments 14 is processed by a textual similarity links identifier 20 that identifies links 22. Each link is defined by a pair of textually similar text fragments. The text fragments of the pair defining the link are identified herein as source and target text fragments.

There are various ways of defining such pairs of text fragments. In general, for N fragments, the computation of links is of order $O(N^2)$. Additionally, the possible presence of noise in the text should be accounted for. Noise can come from various sources, such as incorrect PDF-to-text conversion, or table of contents-specific problems such as a page number that appears in the table of contents but not in the document body, or a series ellipses ( . . . ) that relate the page number to the section title in the table of contents.

In some embodiments, each text fragment is tokenized into a series of alphanumeric tokens with non-alphanumeric separators such as tabs, spaces, or punctuation signs. In some embodiments, a Jaccard is used to measure textual similarity. The Jaccard is computed as the cardinal of the intersection of the two token sets defined by candidate source and target text fragments divided by the cardinal of the union of these two token sets. A link is defined for those pairs in which the Jaccard measure is above a selected matching threshold. In other embodiments an edit distance or other suitable measure is used as the textual similarity comparison. For an edit distance measure, the threshold is a maximum—those pairs having an edit distance less than an edit distance threshold are designated as textually similar pairs.

Figure 2:
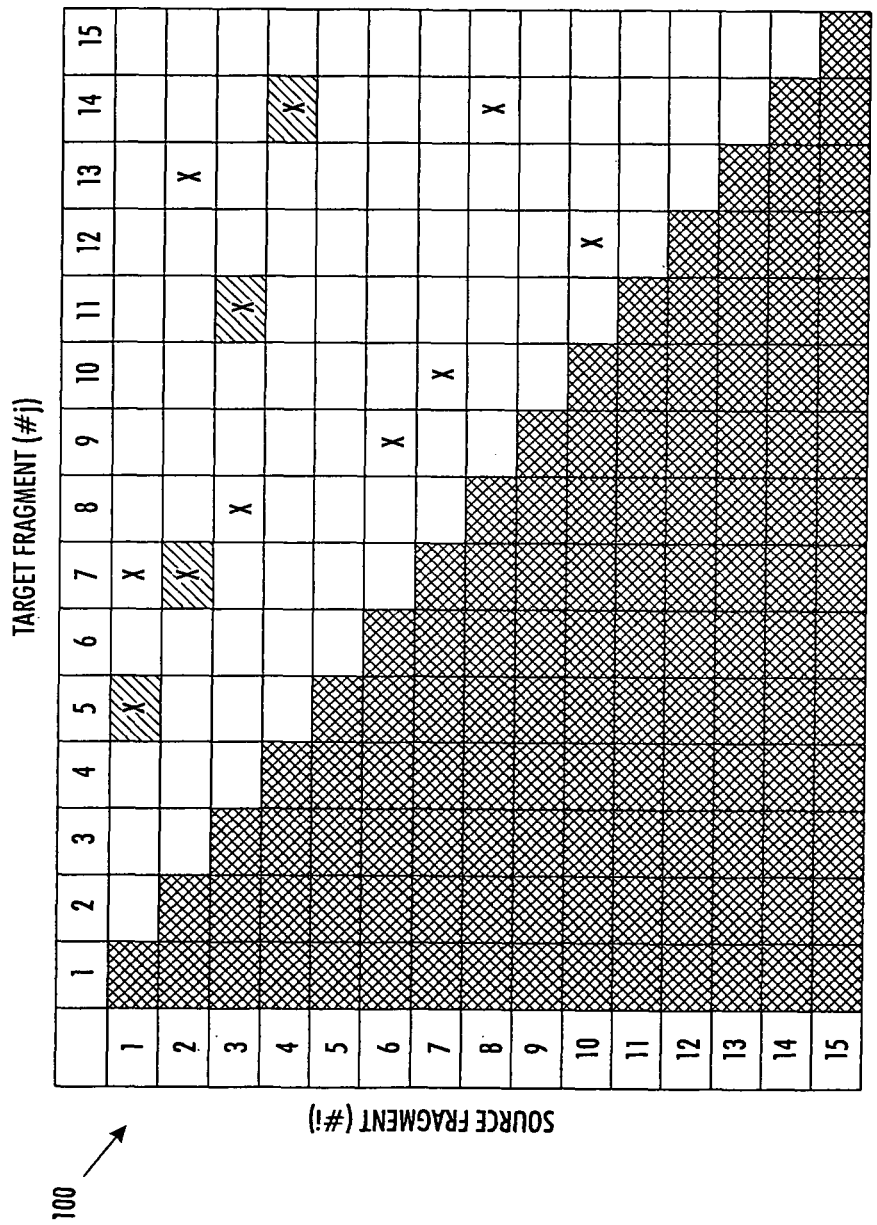
FIG. 2 shows a similarity matrix for a document consisting of fifteen text fragments.

With brief reference to FIG. 2, the textual similarity links are suitably visualized using a similarity matrix 100. Designating as (#i, #j) a link between a source text fragment #i and a target fragment #j, it will be appreciated that since a link (#i, #j) satisfies the threshold or other link selection criterion, it follows that the link (#j, #i) also satisfies the threshold or other link selection criterion. It follows that the similarity matrix elements need only be computed for the upper-right half (or equivalently, lower left-half) of the similarity matrix 100. In FIG. 2, links in which the computed Jaccard exceeds a selected threshold are indicated by "X" marks in the link cells. Moreover, although not shown in FIG. 2 it will be appreciated that each link exceeding the threshold has an associated Jaccard or other metric value that indicates the strength of the link in terms of textual similarity.

Figure 3:
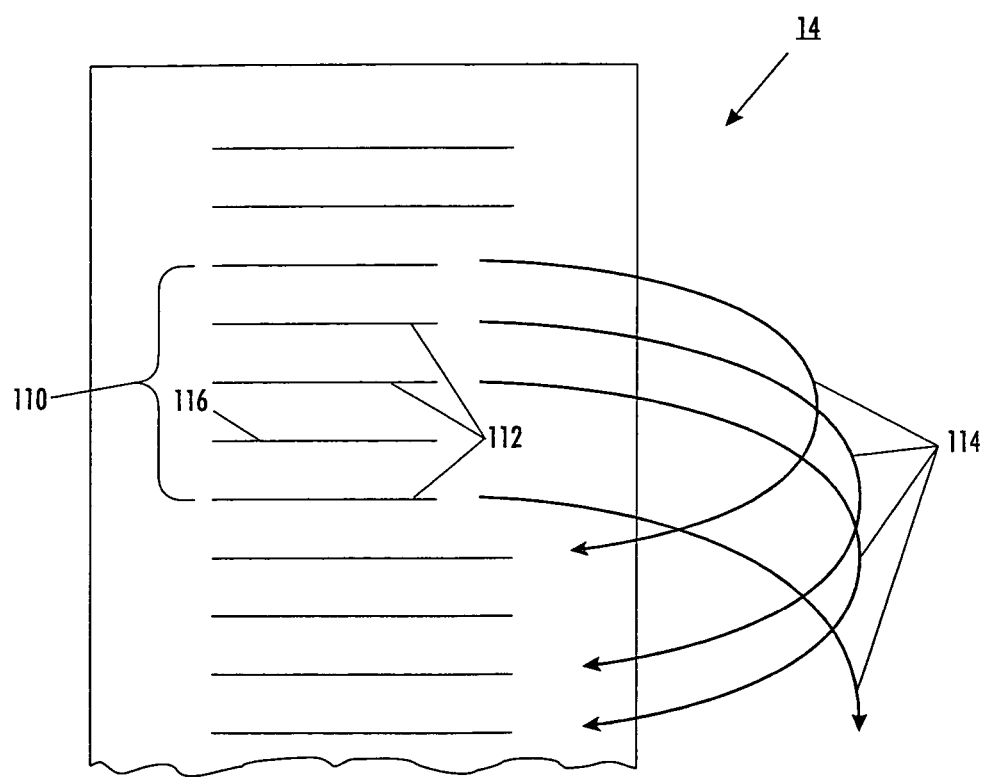
FIG. 3 diagrammatically shows an identified table of contents.

With reference to FIG. 3, a table of contents 110 represents a contiguous sub-sequence of the ordered sequence of text fragments 14. Four general criteria are used to distinguish and identify the table of contents 110 within the ordered sequence of text fragments 14.

The first criterion is contiguity. The table of contents includes a contiguous sub-sequence of the ordered sequence of text fragments 14. Most of the text fragments of this contiguous sub-sequence are expected to be entries 112 of the table of contents. Each entry is linked to a portion of the text that follow the table of contents by one of the links 22. These links that are associated with the table of contents 110 are indicated in FIG. 3 as curved arrows 114. It is to be appreciated that the links 114 of the table of contents 110 are a sub-set of the links 22 computed by the textual similarity links identifier 20. However, the links 22 typically include many links in addition to the sub-set of links 114.

Although most of the text fragments of the table of contents 110 are entries 112, a small portion of the text fragments in the contiguous sub-sequence of text fragments defining the table of contents 110 may be holes, rather than entries 112. The holes do not have associated links 114, and do not represent a table of contents entry linking to another portion of the document. An example hole 116 is shown in FIG. 3. Typically, a ratio of the number of holes to the number of entries is less than about 0.2. In some embodiments, the maximum acceptable number of holes is a user-selectable parameter.

The second criterion is textual similarity. Each link 114 should connect an entry 112 to a heading or other text fragment having text that is similar to the text of the entry. The textual similarity is suitably measured by the Jaccard or other text similarity measure employed by the textual similarity links identifier 20. The target text fragment is typically a section heading in the case of an ordinary table of contents. In the case of a table of contents listing figures of the document (i.e., a table of figures) the target text fragment may be a figure caption. In the case of a table of contents listing tables of the document (i.e., a table of tables) the target text fragment may be a table caption. In some documents the figure and/or table captions may be below the corresponding figures and/or tables.

The third criterion is ordering. The target text fragments of the links 114 should have an ascending ordering corresponding to the ascending ordering of the entries 112. That is, for a set of entries $\{\#i_1, \#i_2, \#i_3, \ldots\}$ having a set of links $\{(\#i_1,\#j_1), (\#i_2,\#j_2), (\#i_3,\#j_3), \ldots\}$ where the set of entries $\{\#i_1, \#i_2, \#i_3, \ldots\}$ have an ascending ordering, it should follow that the ordering of the corresponding set of target fragments $\{\#j_1, \#j_2, \#j_3, \ldots\}$ is also ascending.

The fourth criterion is lack of self-reference. All of the links 114 should initiate from within the table of contents 110, and none of the links 114 should terminate within the table of contents 110. The set of entries $\{\#i_1, \#i_2, \#i_3, \ldots\}$ and the corresponding set of target text fragments $\{\#j_1, \#j_2, \#j_3, \ldots\}$ should have an empty intersection, and moreover none of the target text fragments $\{\#j_1, \#j_2, \#j_3, \ldots\}$ should correspond to a hole text fragment in the table of contents 110.

Figure 4:
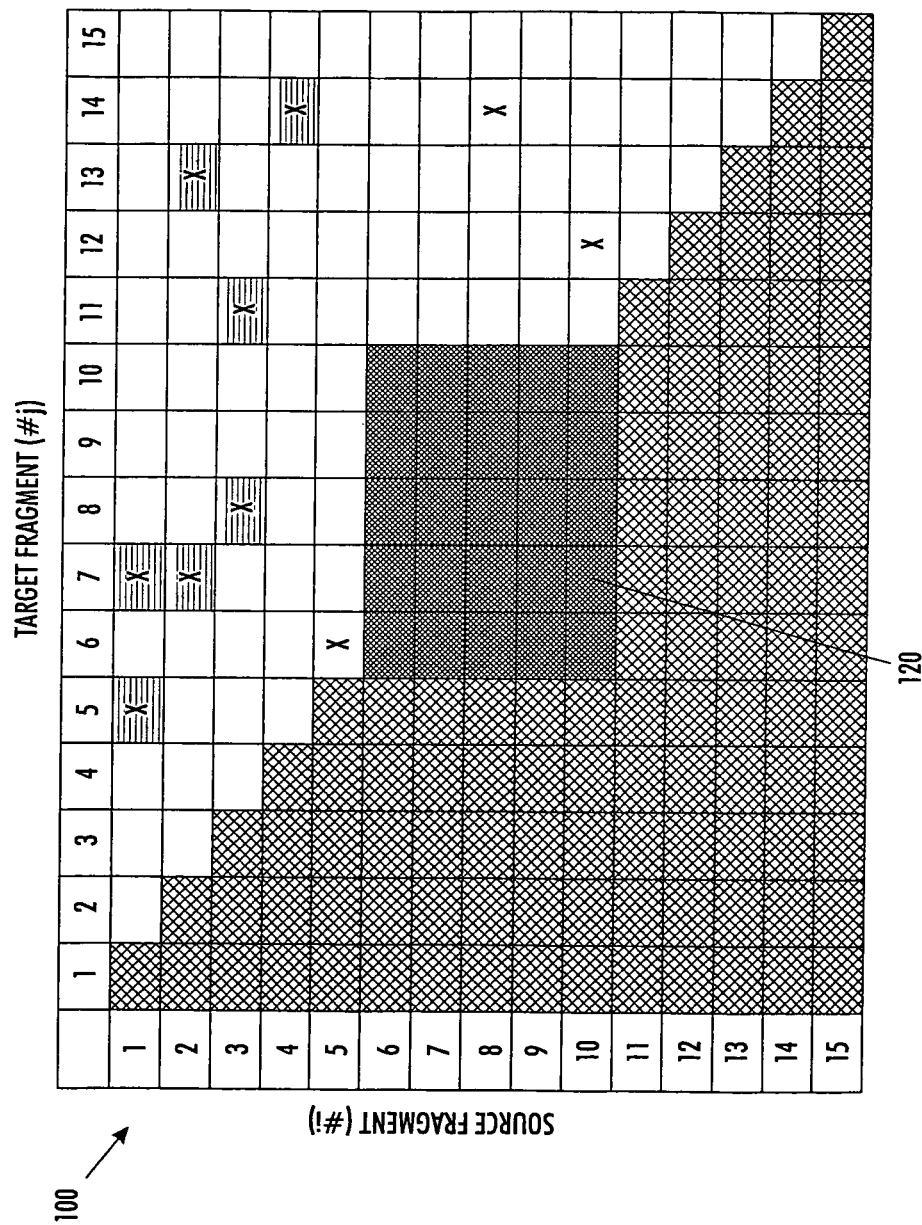
FIG. 4 shows the similarity matrix of FIG. 2 with a portion blocked out due to range restrictions placed on the table of contents.

With reference to FIG. 4, the lack of self-reference along with the observation that the table of contents typically occurs near the beginning of the document can be used to further reduce the search area of the similarity matrix 100. If the table of contents is assumed to be only in the k first and last text fragment, this leaves out the center of the matrix, as shown in dark gray square 120 in FIG. 4 for k=5.

With returning reference to FIG. 1, one approach for selecting from amongst the ordered sequence of text fragments 14 the table of contents 110 including a contiguous sub-sequence of the ordered sequence of text fragments is described. The table of contents is selected based on the contiguity, text similarity, ordering, and non-self-referencing criteria. A candidate tables of contents selector 30 selects one or more candidate tables of contents. In one suitable approach, N hypotheses are tested, corresponding to N candidate starting text fragments for the table of contents. For each of the N possible starting fragments, the hypothesis "Could the table of contents start at this text fragment?" is tested.

In some suitable embodiments, the testing starts at the candidate starting text fragment and then looks at each subsequent text fragment in turn to consider it for inclusion in the candidate table of contents. The candidate table of contents is extended by adding subsequent contiguous text fragments until the addition of a new text fragment breaks the ordering constraint. For example, if last added text fragment is a source text fragment having links to target fragments #j=15 and #j=33, and the next text fragment under consideration is a source text fragment having a link only to target fragment #j=20, then this next text fragment can be added to the candidate table of contents since #j=20 is greater than #j=15. If, however, the next text fragment is a source text fragment only having a link to target fragment #j=12, then this would break the ordering.

However, it is advantageous to relax the ordering constraint somewhat to allow for a few holes in the candidate table of contents. This is suitably achieved by permitting the presence of a certain number of text fragments without any associated links, and by permitting a certain number of fragments with link-crossing, that is, a text fragment for which all of its associated links break the ordering constraints in the candidate table of contents. Allowing some link-crossing is useful if for example the previous text fragment in the current candidate table of contents contained only one link pointing too far ahead in the document.

To enforce the non-self-referencing constraint, a second pass is suitably performed once the extent of the candidate table of contents is tentatively determined with respect to the ordering constraint. Using a second pass accounts for indeterminacy as to the end of the table of contents, as the table of contents end is unknown while it is being extended from its start point. The second pass starts at the original starting text fragment at the top of the candidate table of contents. Each subsequent text fragment is tested. If a subsequent text fragment includes links only to text fragments within the table of contents, then it violates the non-self-referencing criterion—accordingly, the second pass would terminate the candidate table of contents just before that non-self-reference violating text fragment.

Again, however, it may be advantageous to allow a certain number of holes. This is suitably achieved in the second pass by allowing one or a few text fragments of the candidate table of contents to be self-referencing. These text fragments that violate the self-referencing criterion are assumed to be holes, rather than entries, in the candidate table of contents.

This processing is repeated for each of the N possible starting text fragments. The result is a set of one or more candidate tables of contents, each formed of a contiguous list of text fragments. Because the candidate tables of contents were constructed in a way that ensures that the ordering and non-self-reference constraints can be obeyed (while optionally allowing for a limited number of holes), it follows that it is possible to select for each entry of the candidate table of contents one link from its list of acceptable links so that the ordering and non-self-reference constraints are respected. Optionally, filtering criteria may be applied by the candidate tables of contents selector 30 to remove candidate tables of contents that are clearly not correct. For example, a candidate table of contents having fewer than three text fragments may suitably be discarded.

A table of contents selector 34 ranks the candidate tables of contents and selects the highest ranked table of contents. A links optimizer 38 then optimizes the links for that selected table of contents to produce the final selected table of contents 110. In this approach, the table of contents selector 34 ranks the candidate tables of contents using a computationally efficient ranking method, and only the selected table of contents then undergoes the more computationally intensive processing performed by the links optimizer 38. This approach has been found to be satisfactory for accurately selecting the table of contents. A more computationally intensive approach is also contemplated, in which the links optimization is performed for each of the candidate tables of contents and the ranking takes into account the results of the links optimizations.

With continuing reference to FIG. 1, the table of contents selector 34 employs a scoring function to rank the candidate tables of contents. The highest ranked candidate table of contents is then selected for further processing. In some embodiments, the scoring function is the sum of entry weights, where an entry weight is inversely proportional to the number of links associated with an entry of the table of contents. This entry weight characterizes the certainty of any of its associated links, under the assumption that the more links initiate at a given source text fragment, the less likely that any one of those links is a "true" link of a table of contents.

Other scoring functions can be employed. For example, another contemplated scoring function sums the number of entries in the candidate table of contents. A short candidate table of contents is typically less likely to be "correct" than a long table of contents in which a large contiguous sequence of text fragments is found to be capable of satisfying the ordering and non-self-referencing criteria. Yet another contemplated scoring function characterizes the span of the target text fragments respective to the entire document 10. If the available target text fragments of a particular candidate table of contents span only a small portion of the document 10, then it is unlikely that the candidate table of contents is the "true" table of contents for that document. These scoring functions are examples, and other scoring functions, or various combinations of scoring functions, can be employed.

Once the highest ranked candidate table of contents has been selected, the links optimizer 38 is applied to that table of contents to produce the final table of contents 110. The selection of the best link for each of the entries of the table of contents involves finding a global optimum for the table of contents while respecting the four table of contents constraints: contiguity, text similarity, ordering, and non-self-referencing. In some embodiments, a weight is associated to each link, which is proportional to its level of matching.

Figure 5B:
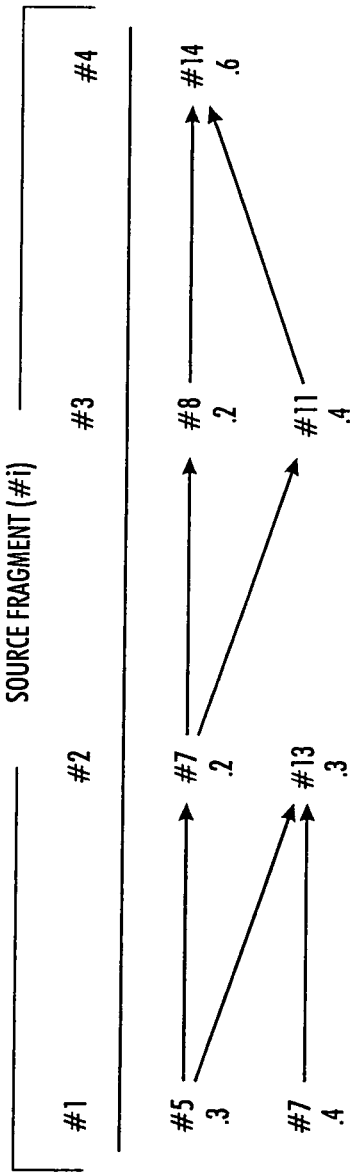

With reference to FIGS. 5A-5E, in some embodiments a Viterbi shortest path algorithm is employed in selecting the optimized links. Each text fragment (#i) of the table of contents is associated with one or more possible target text fragments (#j) as links (#i, #j). A weight is associated with each target text fragment #j of a link (#i, #j). FIG. 5A illustrates an example, in which the table of contents includes text fragments #1, #2, #3, #4. The text fragment #1 is the source text fragment for two possible links: (#1, #5), and (#1, #7). The weight for the (#1, #5) link is 0.3, while the weight for the (#1, #7) link is 0.4. The possible links for text fragment #2 are (#2, #7) with a weight of 0.2 and (#2, #13) with a weight of 0.3. The possible links for text fragment #3 are (#3, #8) with a weight of 0.2 and (#3, #11) with a weight of 0.4. The text fragment #4 has only one possible link, namely (#4, #14) with a weight of 0.6. Any links which would violate the non-self-referencing criterion are suitably omitted. For example, if the text fragment #2 is also a source text fragment for a potential link (#2, #4), then that link is omitted in FIG. 5A since it would violate the non-self-referencing criterion.

FIG. 5B shows a diagram of the combinations of link choices for each text fragment of the table of contents which satisfy the ordering constraint. An arrow in FIG. 5B indicates the possible choice for #i+1 if #j was chosen for #i. For instance, if the text fragment #7 is chosen as the target text fragment for source text fragment #1, then only target text fragment #13 can be chosen as the link for the source text fragment #2, since the other possible target text fragment #5 would violate the ordering property. On the other hand, if the text fragment #5 is chosen as the target text fragment for the source text fragment #1, then either target text fragment #13 or target text fragment #7 can be chosen as the link for the source text fragment #2, since in this case both obey the ordering criterion.

Figure 5C:
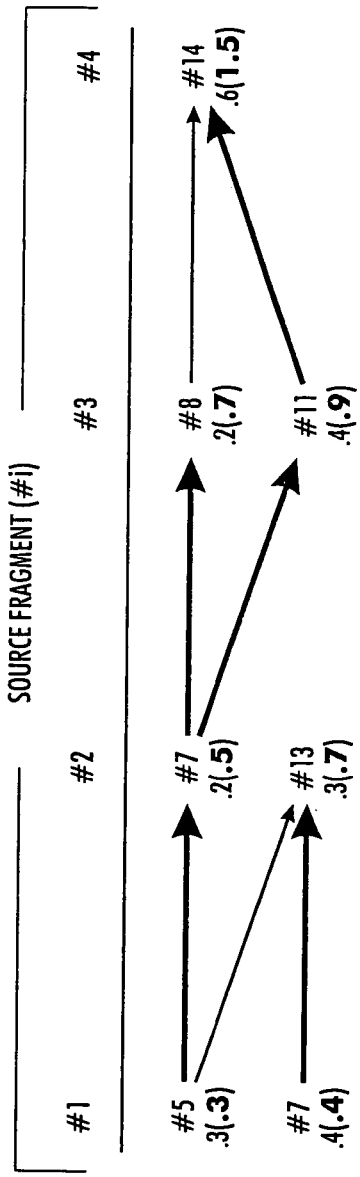

With reference to FIG. 5C, the best path Viterbi algorithm finds the best choice for source text fragment #i given the previous best table of contents choice. The score of a path in the Viterbi algorithm is the sum of its node weights. This is achieved by maintaining the best possible score at each stage together with the corresponding #j as shown in FIG. 5C. Arrows in bold in FIG. 5C indicate the best choice, and the corresponding best choice score is printed in bold.

Figure 5D:
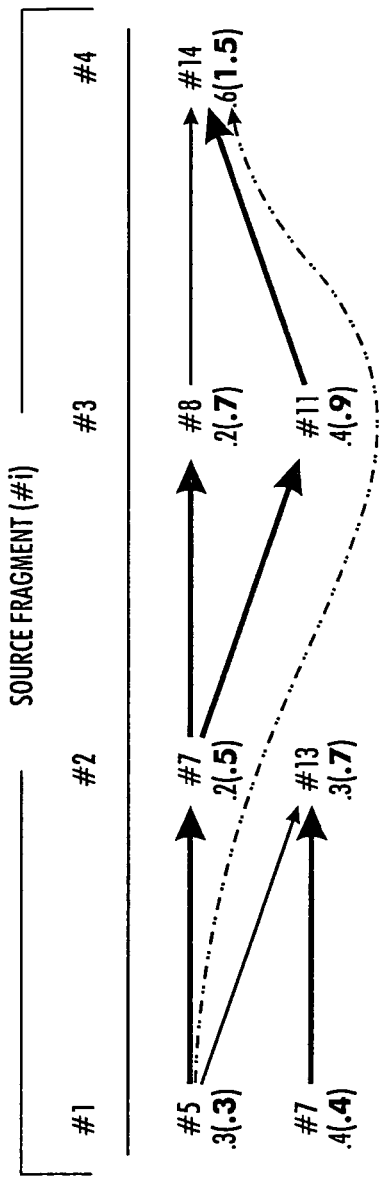

With reference to FIG. 5D, the best combination is obtained by selecting the best score for the last item of the table of contents and then moving backwards (right-to-left) in the diagram, each time selecting the best arrow. This best combination is indicated by the curved and dotted arrow of FIG. 5D.

The approach illustrated in example FIGS. 5C and 5D ignore the possibility of holes, i.e., text fragments of the table of contents that do not link to an outside heading, caption, or the like.

Figure 5E:
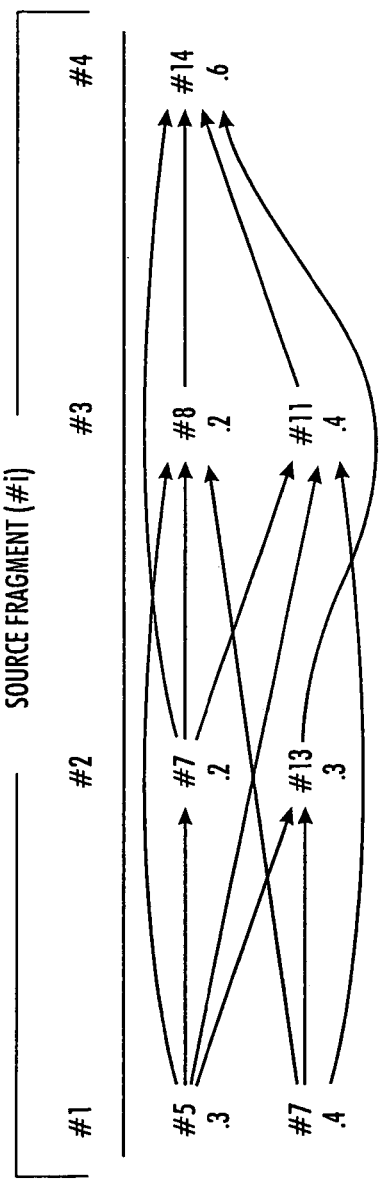
FIGS. 5E and 5F diagrammatically show processing for optimizing links in a selected table of contents that is modified to allow for holes.

FIG. 5E shows the diagram of FIG. 5C modified to permit the table of contents to have a certain number of consecutive holes (i.e., text fragments without any link complying with the ordering and non-self-referencing criteria). This allows jumps over certain stages. For example an arrow connects the potential (#1, #5) link with the potential (#3, #8) link. This accounts for the possibility that the source text fragment #2 of the table of contents may be a hole, rather than an entry.

Figure 5F:
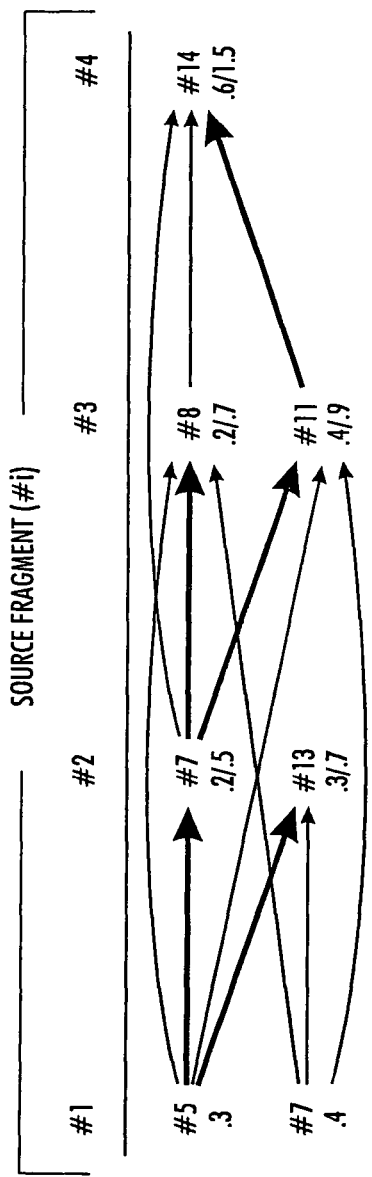

With reference to FIG. 5F which substitutes for FIG. 5D when potential holes are included, the best combination is again obtained by selecting the best score for the last item of the table of contents and then moving backwards in the diagram, each time selecting the best arrow. In this particular case, the result for FIGS. 5D and 5F are the same, since the best fit includes no holes. In other cases, the best fit may include a hole by including an arrow that "jumps over" one of the text fragments of the table of contents.

The disclosed approaches for identifying tables of contents have been applied to a corpus of XML documents produced with Frame Maker and for which dedicated XML tags indicated the TOC and its constituents. The method has been evaluated on 11 documents totalizing around 1500 pages. the precision and recall of the detected table of contents has been measured. The precision is defined as the percentage of identified entries that actually are part of the document table of contents, while the recall is defined as the percentage of actual table of contents entries that are part of the detected TOC. Using the Jaccard text similarity measure with matching thresholds of between 25% and 67% inclusive and the number of allowed holes between 1 and 4 inclusive, precision and recall values above 90% are typically obtained, with some precision and recall values being above 97%.

A matching threshold of about 50% was found to be optimal for table of contents processing of some documents. The processing of links was found to occupy most of the total computation time. As the matching threshold is increased, fewer potential links are identified and processing speed increases. A threshold of 67% was found to give a relatively constant high precision while requiring reduced computation time.

As mentioned previously, the text fragmenter 12 optionally may fragment the text such that one entry of the table of contents corresponds to multiple text fragments, and this may apply as well on the document body. This can lead to a lower quality of reference determination as well as possible holes in the TOC. However, the approach described herein has been found to be relatively robust against such situations. In some embodiments, it is contemplated to segment the document content into relevant text fragments in a pre-processing stage, as commonly performed in OCR systems.

In automated processing, it may be advantageous to include one or more quality control checks to flag automatically generated tables of contents that are of questionable validity. For example, a table of contents including fewer than three entries is likely to be invalid. Similarly, a table of contents that spans only a small portion of the total document is optionally flagged as suspect.

In some applications, the identified table of contents is used for further processing. For example, the table of contents 110 can be employed to structure the unstructured document 10 by dividing it up into text sections linked to table of contents entries to produce a structured document. When the table of contents is used for automated structuring of the document, it is typically advantageous to strictly enforce the ordering criterion since cross-linking can lead to errors in the formatting of the structured document.

While the foregoing has particularly addressed the example application of identifying a table of contents indexing text sections, it is to be appreciated that the disclosed approaches are also applicable to identifying tables of contents indexing other features of a document, such as figures (commonly called a "table of figures"), tables (commonly called a table of tables), equations, and so forth.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A method for identifying a table of contents in a document, the method comprising:
deriving an ordered sequence of text fragments from the document;
defining links between pairs of text fragments satisfying a textual similarity criterion, each link including a source text fragment and a target text fragment; and
selecting from amongst the ordered sequence of text fragments a table of contents including a contiguous sub-sequence of the ordered sequence of text fragments, text fragments of the table of contents defining entries of the table of contents each having a target text fragment selected from links that include the entry as the source text fragment, the selecting of the table of contents utilizing selection criteria including at least (i) providing an ascending ordering for the selected target text fragments, and (ii) providing that no entry of the selected table of contents has a selected target text fragment that is included in the selected table of contents;
wherein the deriving, defining, and selecting is performed by a computer.

2. The method as set forth in claim 1, further comprising:
tokenizing the text fragments to define alphanumeric tokens separated by non-alphanumeric separators.

3. The method as set forth in claim 2, wherein the textual similarity criterion employed in defining the links includes a Jaccard.

4. The method as set forth in claim 2, wherein the textual similarity criterion employed in defining the links includes the cardinal of the intersection of the two token sets defined by the source and target text fragments divided by the cardinal of the union of the two token sets defined by the source and target text fragments.

5. The method as set forth in claim 1, wherein the selected table of contents includes holes defined by text fragments that do not define entries, the number of holes being substantially smaller than the number of entries, the holes not being considered in evaluating criteria (i) and (ii).

6. The method as set forth in claim 1, wherein the selecting includes:
determining one or more candidate tables of contents each including a contiguous sub-sequence of the ordered sequence of text fragments;
ranking the candidate tables of contents, the ranking of each candidate being based at least on links whose source text fragments are included in the candidate table of contents;
selecting the highest ranked candidate table of contents as a selected table of contents; and
selecting the target text fragment for each entry of the selected table of contents.

7. The method as set forth in claim 6, wherein the ranking of each candidate table of contents includes (i) computing for each text fragment of the candidate table of contents an inverse of the number of links including that text fragment as the source text fragment, and (ii) summing the inverses to compute a ranking for the candidate table of contents.

8. The method as set forth in claim 6, wherein the selecting of the target text fragment for each entry includes:
employing a Viterbi algorithm to select optimized target text fragments that satisfy criteria (i) and (ii).

9. The method as set forth in claim 6, wherein the determining of one or more candidate tables of contents includes:
determining candidate tables of contents including text fragments whose links can be selected to satisfy the criteria (i) and (ii).

10. The method as set forth in claim 6, wherein the determining of one or more candidate tables of contents includes:
initiating a first candidate table of contents with a starting text fragment;
adding a next text fragment to the first candidate table of contents conditional upon the next text fragment having at least one link that satisfies criterion (i);
iterating the adding until a next text fragment fails criterion (i);
verifying the resulting first table of contents satisfies criterion (ii), the verifying including truncating the first table of contents just before any text fragment whose inclusion would violate criterion (ii); and
repeating the initiating, adding, iterating, and verifying for a plurality of different starting text fragments to generate the one or more candidate tables of contents.

11. An apparatus for identifying a table of contents in a document, the apparatus comprising:
a computer programmed to perform a method including deriving an ordered sequence of text fragments from the document and selecting a table of contents as a contiguous sub-sequence of the ordered sequence of text fragments wherein the selecting employs the criteria:
(i) entries defined by text fragments of the table of contents each have a link to a target text fragment having textual similarity with the entry,
(ii) no target text fragment lies within the table of contents, and
(iii) the target text fragments have an ascending ordering corresponding to an ascending ordering of the entries defining the target text fragments.

12. The apparatus as set forth in claim 11, wherein the selected table of contents includes holes defined by text entries of the selected table of contents that do not define entries, the number of holes being substantially smaller than the number of entries, the holes not being considered in evaluating criteria (i), (ii), and (iii).

13. The apparatus as set forth in claim 11, wherein the method performed by the computer further includes:
constructing a structured document including the ordered sequence of text fragments, the structured document being structured in accordance with the selected table of contents and having sections associated with the corresponding target text fragments.

14. The apparatus as set forth in claim 11, wherein the selecting of a table of contents includes:
determining a plurality of textual similarity links associating pairs of text fragments, at least some text fragments being included in more than one link;
determining a plurality of candidate tables of contents each defined by a contiguous sub-sequence of the ordered sequence of text fragments and each having at least one combination of links satisfying criteria (i), (ii), (iii);
ranking each candidate table of contents based on the textual similarity links having source text fragments contained in the candidate table of contents;
choosing the highest ranked candidate tables of contents as the table of contents; and optimizing the plurality of textual similarity links having source text fragments contained in the table of contents to select no more than a single link for each entry, the optimizing satisfying criteria (i), (ii), and (iii).

15. The apparatus as set forth in claim 14, wherein the determining of textual similarity links includes:
   tokenizing the text fragments;
   quantitatively comparing tokens of pairs of text fragments;
   identifying a pair of text fragments as linked conditional upon the quantitative comparing exceeding a selected threshold.

16. The apparatus as set forth in claim 14, wherein the determining of each of the plurality of candidate tables of contents includes:
   assigning a starting text fragment to the candidate table of contents;
   successively adding subsequent contiguous text fragments that satisfy the ordering criterion (iii) until a text fragment is reached that would violate the ordering criterion (iii); and
   performing a second pass through the candidate table of contents starting at the starting text fragment the second pass terminating the candidate table of contents just before a text fragment whose inclusion would violate the criterion (ii).

17. An apparatus for identifying a table of contents in a document, the apparatus comprising: a process, comprising:
   a text fragmenter that derives an ordered sequence of text fragments from the document;
   a links identifier that defines links between pairs of text fragments satisfying a textual similarity criterion, each link including a source text fragment and a target text fragment;
   a candidate table of contents selector that selects a plurality of candidate tables of contents, each candidate including a contiguous sub-sequence of the ordered sequence of text fragments that potentially can satisfy criteria including at least an ordering criterion and a non-self-referencing criterion;
   a table of contents selector that selects one of the candidate tables of contents; and
   a links optimizer that selects optimized links for text fragments defining entries of the selected table of contents, the optimized links satisfying the ordering criterion and the non-self-referencing criterion.

18. The apparatus as set forth in claim 17, wherein the ordering criterion requires that for a set of entries $\{\#i_1, \#i_2, \#i_3, \ldots\}$ having set of links $\{(\#i_1,\#j_1), (\#i_2,\#j_2), (\#i_3,\#j_3), \ldots\}$ where the set of entries $\{\#i_1, \#i_2, \#i_3, \ldots\}$ have an ascending ordering, it follows that the ordering of the corresponding set of target fragments $\{\#j_1, \#j_2, \#j_3, \ldots\}$ is also ascending.

19. The apparatus as set forth in claim 17, wherein the non-self-referencing criterion requires that for a set of entries $\{\#i_1, \#i_2, \#i_3, \ldots\}$ having a set of links $\{(\#i_1,\#j_1), (\#i_2,\#j_2), (\#i_3,\#j_3), \ldots\}$, the set of entries $\{\#i_1, \#i_2, \#i_3, \ldots\}$ and the corresponding set of target text fragments $\{\#j_1, \#j_2, \#j_3, \ldots\}$ should have an empty intersection.

\* \* \* \* \*